US007986692B2

(12) United States Patent
McDonald et al.

(10) Patent No.: US 7,986,692 B2
(45) Date of Patent: Jul. 26, 2011

(54) SYSTEM AND METHOD FOR TRANSMITTING CALL INFORMATION IN A COMMUNICATION SYSTEM WITH LONG LINK DELAYS

(75) Inventors: Daniel J. McDonald, Cary, IL (US); John W. Maher, Woodstock, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 816 days.

(21) Appl. No.: 11/683,665

(22) Filed: Mar. 8, 2007

(65) Prior Publication Data

US 2008/0219259 A1    Sep. 11, 2008

(51) Int. Cl.
*H04L 12/56* (2006.01)

(52) U.S. Cl. ........ 370/390; 370/352; 709/238; 455/509; 455/518

(58) Field of Classification Search .................. 370/390, 370/252; 709/238, 239; 455/518
See application file for complete search history.

(56) References Cited

U.S. PATENT DOCUMENTS

| | | | | |
|---|---|---|---|---|
| 3,806,804 A | * | 4/1974 | Mills et al. ................ | 455/509 |
| 6,131,123 A | * | 10/2000 | Hurst et al. ................ | 709/238 |
| 6,574,232 B1 | * | 6/2003 | Honig et al. ................ | 370/413 |
| 7,184,421 B1 | * | 2/2007 | Liu et al. ................ | 370/338 |
| 7,296,088 B1 | * | 11/2007 | Padmanabhan et al. ...... | 709/238 |
| 2002/0141394 A1 | * | 10/2002 | Hardisty ................ | 370/352 |
| 2002/0191584 A1 | | 12/2002 | Korus | |
| 2003/0083087 A1 | * | 5/2003 | Ekl et al. ................ | 455/518 |
| 2006/0147204 A1 | * | 7/2006 | Yasukawa et al. .............. | 398/26 |
| 2007/0002859 A1 | | 1/2007 | Corson | |
| 2008/0080501 A1 | * | 4/2008 | Damm ................ | 370/390 |

FOREIGN PATENT DOCUMENTS

WO    WO2005078998 A    8/2005

* cited by examiner

*Primary Examiner* — Robert W Wilson
*Assistant Examiner* — Mohamed Kamara
(74) *Attorney, Agent, or Firm* — Terri S. Hughes; Anthony P. Curtis

(57) ABSTRACT

A system and method for transmitting call information in a communication system having sites with long link delays. Upon a call being initiated within the communication system, a zone controller determines the participating sites that are to be involved in the call and assigns an IP multicast group address for the call. The zone controller also determines whether any of the participating sites have a long link delay. If any of the participating sites do have a long link delay, the zone controller also assigns an IP unicast address for each such site. The call information is then transmitted both on the IP multicast address as well as on each assigned IP unicast address to ensure that the call is received by each participating site without the loss of call information.

18 Claims, 4 Drawing Sheets

SYSTEM AND METHOD FOR TRANSMITTING CALL INFORMATION IN A COMMUNICATION SYSTEM WITH LONG LINK DELAYS

TECHNICAL FIELD OF THE INVENTION

This invention relates generally to communication systems, and more particularly, to a system and method for transmitting call information in a communication system with long link delays.

BACKGROUND OF THE INVENTION

Communication systems typically include a plurality of dispatch consoles and communication units, such as mobile or portable radio units, that are geographically distributed among various base sites and console sites. The communication units wirelessly communicate with the base sites and each other, and are often logically divided into various talkgroups. Communication systems may be organized as trunked systems, where a plurality of radio frequency (RF) communication resources are allocated amongst multiple users or groups by assigning the base sites within a coverage area on a call-by-call basis, or as conventional (non-trunked) systems where RF communication resources are dedicated to one or more users or groups. In trunked systems, or in mixed trunked and conventional systems, there is usually provided a central controller/server (sometimes called a "zone controller") for allocating RF communication resources among a group of sites. The zone controller may reside within a single device or multiple devices and may be located at a fixed equipment site or may be distributed among the base sites.

Calls between members of a talkgroup are typically accomplished by a user activating a microphone button and speaking into the microphone. Upon activation of the microphone button, the communication unit transmits a call request including a communication unit identifier and a talkgroup identifier to a zone controller. The zone controller identifies the talkgroup, locates other members of the talkgroup, and assigns an IP multicast group address for any participating sites (which may be base sites, console sites, or the like) to join. Once the participating sites are joined to the multicast group that is assigned to the talkgroup, the network distributes the call information (such as voice, data, video or the like) to participating sites that distribute the call information to the other members of the talkgroup as the user begins speaking.

While trunking systems work relatively well, they are adversely affected by long link delays between the various sites participating in the call. In particular, the participating sites may be located over multiple zones, and may be connected to the communication system via various transport types, such as T1s, E1s, Ethernet links, satellite links, etc. Because of the varying geographic distances and transport types, the call information distribution experiences varying delay characteristics. When participating sites having excessively long link delays are involved in the call, the call setup time (i.e., the time required for the participating site to be joined to the multicast group) may be too long and call information at the beginning of a transmission may be lost or truncated.

BRIEF DESCRIPTION OF THE FIGURES

Various embodiment of the invention are now described, by way of example only, with reference to the accompanying figures.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help improve the understanding of various embodiments of the present invention. Also, common but well-understood elements that are useful or necessary in a commercially feasible embodiment are not often depicted in order to facilitate a less obstructed view of these various embodiments of the present invention. It will be further appreciated that certain actions and/or steps may be described or depicted in a particular order of occurrence while those skilled in the art will understand that such specificity with respect to sequence is not actually required. It will also be understood that the terms and expressions with respect to their corresponding respective areas of inquiry and study except where specific meaning have otherwise been set forth herein.

DETAILED DESCRIPTION OF THE INVENTION

There is a need for a system and method for setting up trunked calls when participating sites having long link delays are present. A system and method for transmitting call information in a communication system having sites with long link delays are disclosed herein. Upon a call being initiated within the communication system, a zone controller determines the participating sites that are to be involved in the call and assigns an IP multicast group address for the call. The zone controller also determines whether any of the participating sites have a long link delay. If any of the participating sites have a long link delay, the zone controller also identifies an IP unicast address for each such site and informs the sourcing site of each IP unicast address. The call information is then transmitted both on the IP multicast address as well as on each assigned IP unicast address. Each long link delay site continues receiving the call information on the IP unicast address until the long link delay site is able to join the multicast group and begin receiving overlapping call information, at which time the IP unicast transmission may be stopped.

Figure 1:
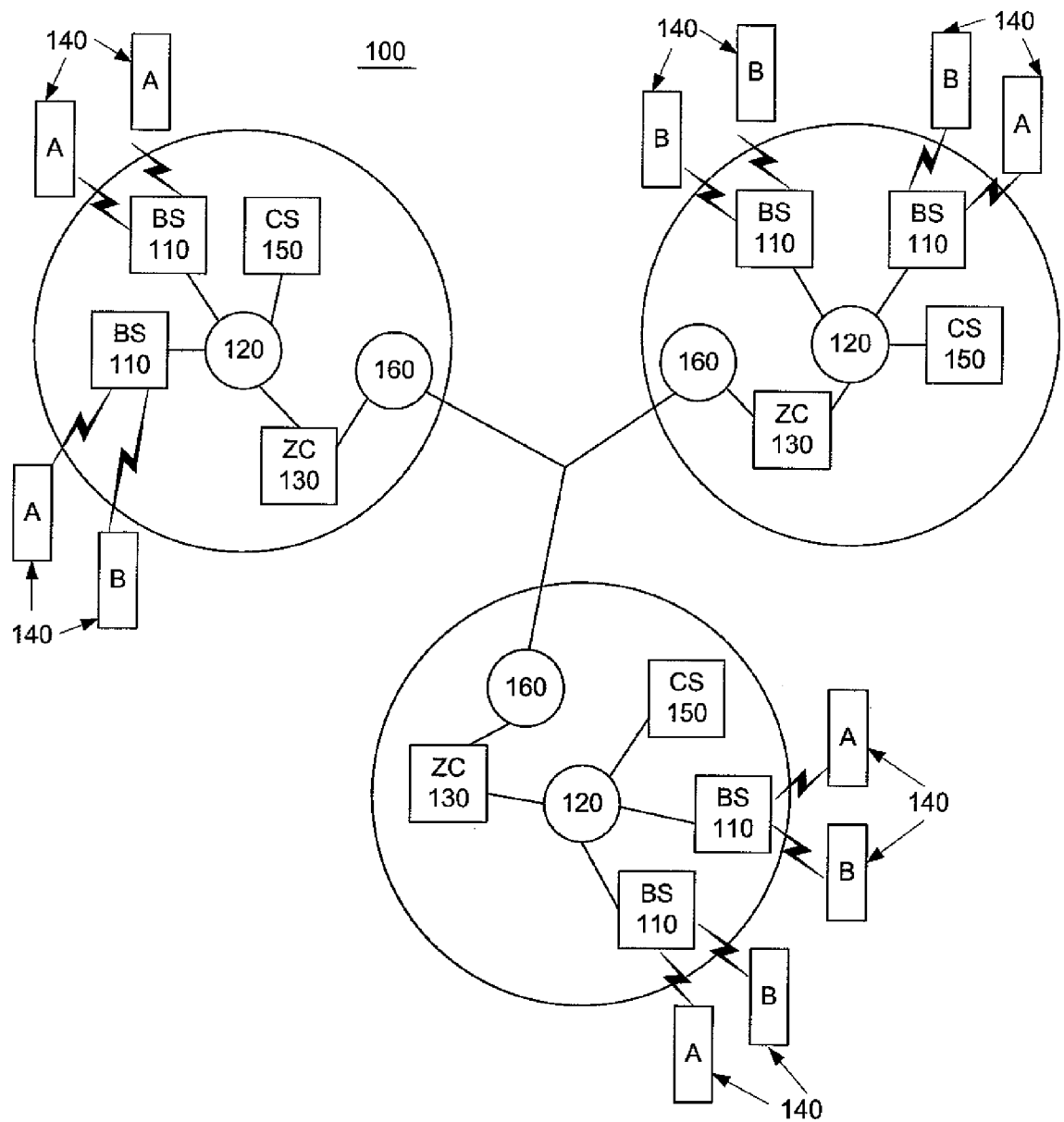
FIG. 1 shows one embodiment of a communication system according to the present disclosure.

Let us now discuss the present disclosure in greater detail by referring to the figures below. FIG. 1 shows one embodiment of a communication system 100 according to the present disclosure. The system 100 comprises a plurality of zones 102. Each zone includes a plurality of base sites 110 that are in communication with a core router 120. The core router is also coupled to a zone controller 130. The zone controller 130 manages and controls payload (voice, data, video, etc.) and control messages between and among the various base sites 110. The zone controller 130 is also responsible for assigning call channels at the base sites 110.

Each base site 110 is configured to communicate with communication units 140 within a specific coverage area. Although not shown for the sake of clarity, it should be understood that each base site 110 may be comprised of multiple repeaters that are coupled to the core router 120 via a site router. Each individual repeater may be configured to communicate with communication units 140 using wireless communication resources. The wireless communication resources may include any type of communication resource such as, for example, radio frequency (RF) technologies, including, but not limited to Code Division Multiple Access (CDMA), Time Division Multiple Access (TDMA), Frequency Division Multiple Access (FDMA), and the like. Other wireless technologies, such as those now known or later to be developed and including, but not limited to, infrared, Bluetooth, electric field, electromagnetic, or electrostatic transmissions, may also offer suitable substitutes.

The communication units 140 may be mobile or portable wireless radio units, cellular radio/telephones, video terminals, portable computers with wireless modems, or any other wireless devices. The communication units 140 may also be arranged into talkgroups having corresponding talkgroup identifications as known in the art. In FIG. 1, two separate talkgroups are illustrated, identified by labels "A" and "B." However, any number of talkgroups having corresponding talkgroup identifications may be established within the system 100.

The core router 120 may also be further coupled to a console site 150 having one or more dispatch consoles. Although not show for the sake of clarity, it should be understood that the dispatch consoles may be coupled to a console site router, which is in turn coupled to the core router 120. Console sites can affiliate with either or both talkgroups "A" and "B" and, accordingly, may be considered members of both talkgroups "A" and "B." Although not shown in FIG. 1, it should also be appreciated that a single site may include both repeaters and dispatch consoles.

To provide for interzone communications, each of the zones 102 is also coupled to one another via exit routers 160. In the embodiment shown in FIG. 1, the exit routers 112 are coupled directly to the zone controllers 130, but it should be understood that other configurations are also envisioned. For example the exit routers 160 may alternatively be coupled directly to the core routers 120 and/or base sites 1120. In one embodiment, the base sites 110, core routers 120, zone controllers 130, console sites 150, and exit routers 160 may be coupled using T1 lines, E1 lines, fiber optic lines, wireless links, satellite links, Ethernet links, or any other suitable means for transporting data between the various components.

Practitioners skilled in the art will appreciate that the system 100 may also include various other elements not shown in FIG. 1. For example, although one console site 150 and two base sites 110 are illustrated in each zone 102, the system 100 may include any number of console sites and base sites. The system 100 may include remote sites configured to provide simulcast transmissions. The system 100 may also be linked to a public switched telephone network (PSTN), a paging network, a facsimile machine, or the like. The communication system 100 may also be connected to a number of additional content sources, such as the Internet or various Intranets.

In accordance with the present disclosure, the various components in the system, such as, for example, base sites 110, zone controllers 130, and console sites 150 are Internet Protocol (IP) host devices that are able to transport packet data representative of call information (such as voice, video, data, or the like) or control traffic to other host devices in the system. In particular, call information is divided into IP packets called datagrams, which include addressing information (e.g., source and destination addresses) that enables the routers throughout the network to transport the packets to the specified destination(s). Communications transmitted within the system may be either unicast communications or multicast communications. In unicast communications, a one-to-one client/server relationship is established where a client receives a distinct data stream from a server. By contrast, in multicast transmissions, a single data stream is sent to multiple recipients as a group transmission.

Figure 2:
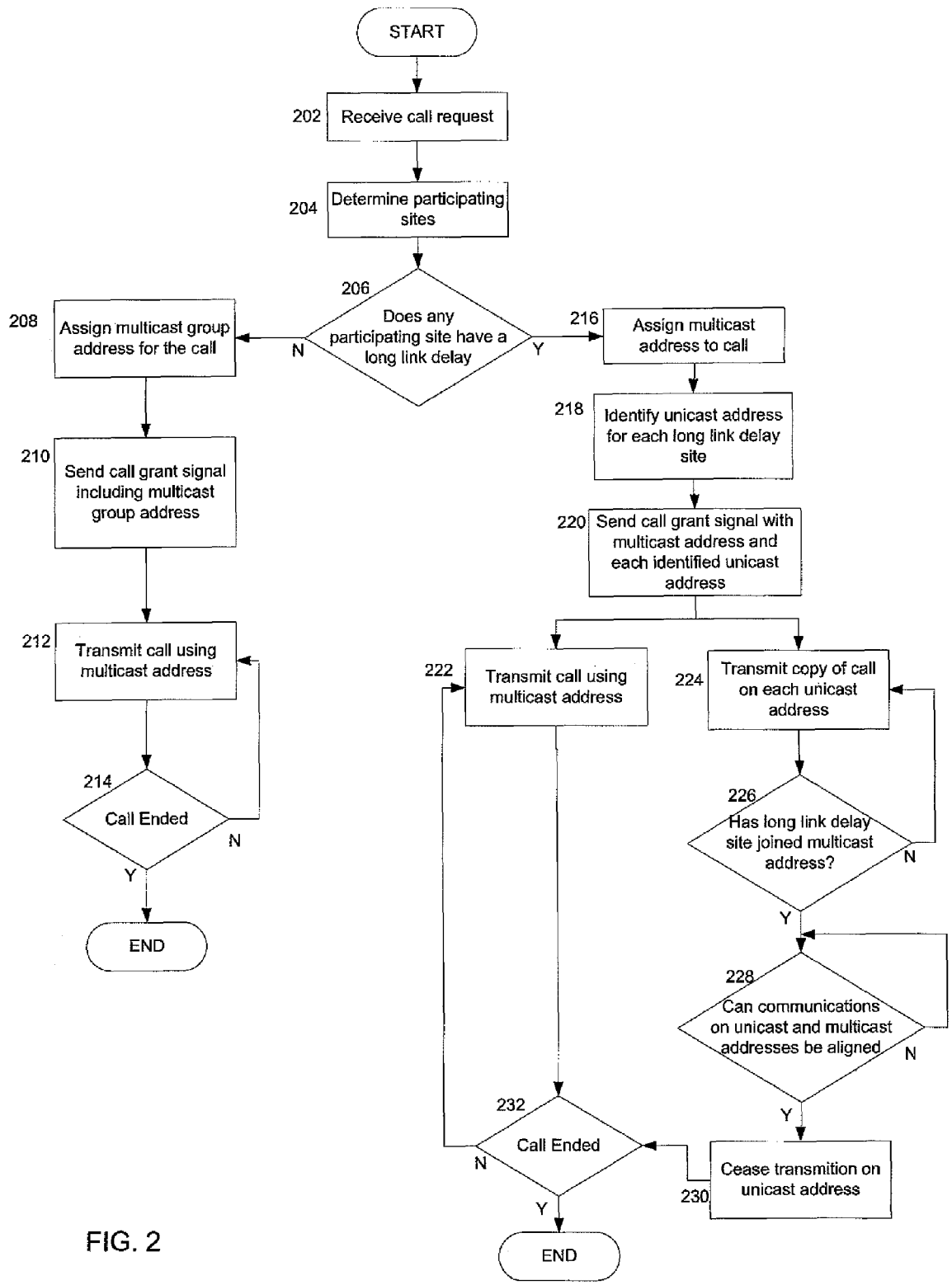
FIG. 2 shows one embodiment of a method for transmitting call information according to the present disclosure.

FIG. 2 illustrates one exemplary method for transmitting calls between members of a talkgroup in accordance with the present disclosure. In step 202, a call request is received by a zone controller 130 from a communication unit 140, a dispatch console, or the like indicating that a call has been initiated. For purposes of this disclosure, the device from which the call request is received is referred to as a calling unit.

Upon receiving the call request, the zone controller 130 identifies the location of other members in the talkgroup in step 204. More particularly, the zone controller 130 determines the base sites 110 and console sites 150 at which members of the talkgroup are present (collectively referred to as "participating sites"). The zone controller 130 also allocates the particular resources (e.g., repeaters) that are to be used for the call at each participating site. It is of course understood that participating sites may be either in the same zone as the calling unit or in another zone.

Figure 3:
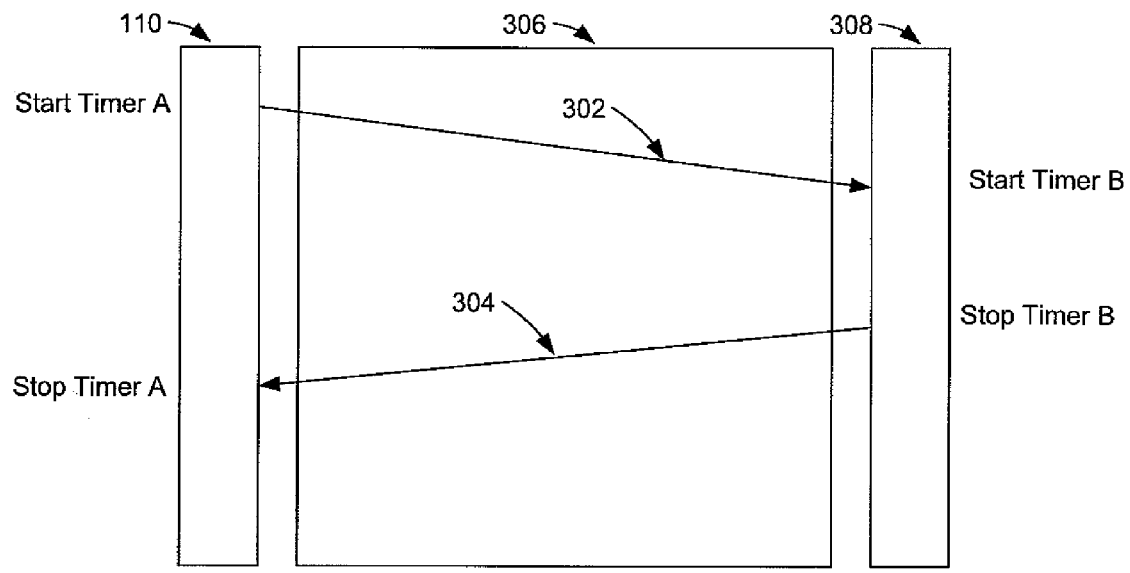
FIG. 3 shows one embodiment of a process for determining link delay times according to the present disclosure.
Figure 4:
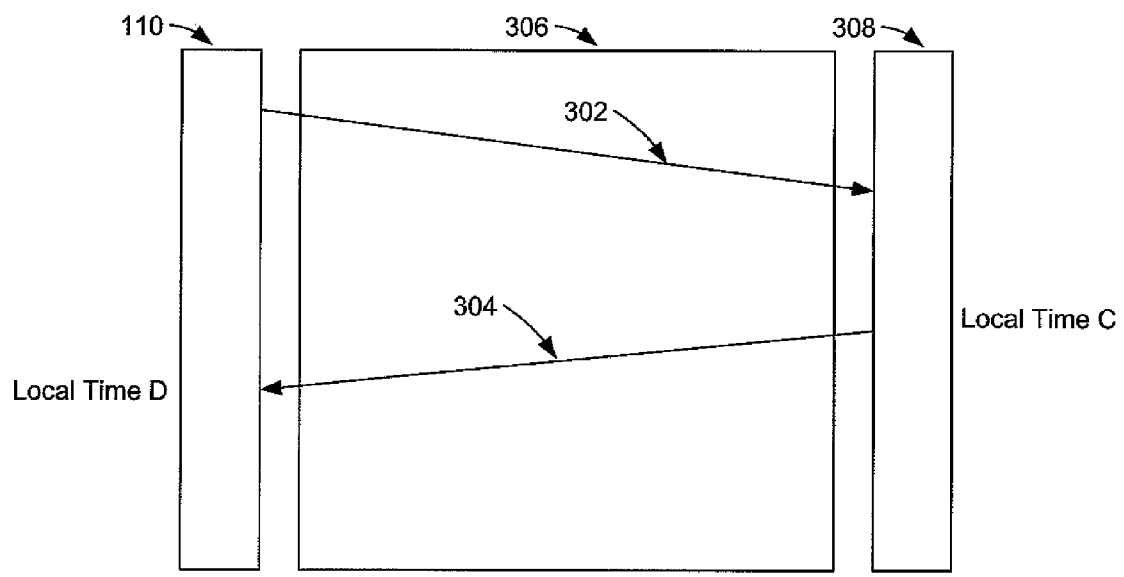
FIG. 4 shows another embodiment of a process for determining link delay times according to the present disclosure.

In step 206, the zone controller determines whether any of the participating sites have a long link delay. Two exemplary embodiments for determining link delay times are illustrated in FIGS. 3 and 4. As shown in FIG. 3, a first signal 302 is transmitted from the zone controller 110 to a participating site 308 via site links 306. At the same time, the zone controller 110 also activates a timer A, which is used to measure the time delay between transmission of the first signal 302 and the receipt of a second response signal 304. Upon receiving the first signal 302 from the zone controller 110, the participating site 308 begins processing the first signal 302. The participating site 308 also activates a timer B that is used to measure the processing time of the first signal 302. Once the participating site 308 finishes processing the first signal 302, the timer B is stopped and the response signal 304 is sent to the zone controller 110. The response signal 304 includes the elapsed time indicated by timer B. When the zone controller 110 receives the response signal 304, the timer A is stopped and the link delay time is computed by subtracting the time B from the time A.

Alternatively, as shown in FIG. 4, rather than using a timer B, the participating site 308 may simply time stamp each response signal 304 with its local time C. The zone controller 110 may then compare the time stamp C either with its own local time D at the time the response signal is received to determine a one-way packet link delay time.

Regardless of whether the process in FIG. 3 or 4 is used, the determined link delay time is then compared to a link delay threshold value, which may be preset for the communication system 100 by a network administrator or the like. If the link delay time for a particular participating site exceeds that threshold value, then that site is considered to have a long link delay. Generally, participating sites are considered to have a long link delay if they are unable to join a multicast group in time to receive a call without losing part of the call information at the beginning of the user's transmission.

In one embodiment, the determination of the link delay times for each participating site may be performed at the beginning of each call. Alternatively, the determination of link delay times for each of the various sites in the system may also be performed upon configuration of the system or at predetermined intervals. In these cases, the link delay times for each site may be stored and accessed by the zone controller 130 whenever a call is initiated. The signals used for determining the link delay times may also be dedicated signals used solely for this purpose or previously defined signals used for call setup. If the participating site is within a different zone, the link delay time information may also be shared between the controlling zone controller (i.e. the zone controller for the zone in which the calling unit is located) and the participating zone controller for the other zone (i.e., the zone controller for the non-sourcing zones with communication units or consoles participating in the call).

Of course, other methods for determining the link delay time for each participating site may also be used. Various base sites 110 and console sites 150 within the system may also be manually identified as having long link delays by a network manager.

Referring back to FIG. 2, if none of the participating sites have a long link delay time, the multicast call is processed in accordance with traditional techniques. That is, the controlling zone controller assigns an IP multicast group address for the call in step 208. In step 210, the zone controller issues one or more call grant signals to the sourcing site (i.e., the site at which the calling unit is located), as well as the participating sites, identifying the IP multicast group address to be used for the call. Upon receiving the call grant signal, each participating site joins the multicast group by transmitting an IGMP JOIN message for the IP multicast group address, which includes the IP address of the participating site. In step 212, the call information (which may be audio, data, video, or the like) from the calling unit is routed by the sourcing site to the IP multicast group address, upon which the call information is then forwarded to each of the participating sites that have joined the multicast group. Each participating site then transmits the received information to communication unit 140 or dispatch consoles 150, as appropriate. The sourcing site continues to transmit the communication until the call is determined to have ended in step 214.

However, if any of the participating sites are determined to have long link delays, the system is configured to process the call in accordance with the present disclosure. Thus, the zone controller 130 assigns an IP multicast group address for the call in step 216. The zone controller 130 also identifies one or more IP unicast address(es) for any participating sites determined to have a long link delay in step 218. For example, the IP unicast address may be the IP address for a participating base site or console site. Alternatively, the IP unicast address may be the IP address of a particular resource (e.g., repeater) at a base site assigned to the call or the IP address of a particular dispatch console at a console site. In this instance, it should also be understood that if multiple resources or dispatch consoles at a site are assigned to the call, multiple IP unicast addresses may be identified for a single site. In step 220, the zone controller 130 issues one or more call grant signals to the sourcing site, as well as the participating sites, identifying both the IP multicast group address as well the IP unicast address(es) to be used for the call.

Upon receiving a call grant signal, the various participating sites join the IP multicast group by transmitting an IGMP JOIN message for the IP multicast group address. Participating sites that do not have long link delays will generally be capable of joining the multicast group in sufficient time to begin receiving the start of the call, while participating sites that have long link delays are unable to do so.

In step 222, the call information initiated by the calling unit is routed by the sourcing site to the IP multicast address, upon which the call information is then forwarded to each of the participating sites that have joined the multicast group. To ensure that participating sites with long link delays (also referred to as long link delay sites) receive the entirety of the call without truncating any information, the sourcing site creates a duplicate copy of the call information for each long link delay site and transmits a copy of the call information to each such site using the assigned IP unicast address in step 224.

Since, due to bandwidth limitations, it may not be desirable to continue transmitting copies of the call information on IP unicast addresses for the duration of the call, the system may be configured to transmit the call on an IP unicast address only so long as it takes for the associated long link delay site to join the multicast group and begin receiving overlapping audio. Thus, as shown in FIG. 2, it is determined, for each long link delay site, whether the long link delay site has joined the multicast group and begun receiving call information in step 226. If the long link delay site has not yet received call information via the multicast group, the process returns to step 226 and the sourcing site continues to transmit the call on the IP unicast address. Once the long link delay site begins receiving call information via the IP multicast group address, the process proceeds to step 228. Although the participating site is receiving both unicast and multicast call information at this time, it should be understood that it is the unicast call information that is being provided to the appropriate communication units or dispatch consoles at the participating site.

In step 228, it is determined whether the call information being received on the IP multicast group address can be aligned with the call information being received on the IP unicast address (i.e., can the participating site switch from using the unicast call information to the multicast call information without losing any portion of the call). If the unicast and multicast call information cannot be aligned, the call information continues to be transmitted on the IP unicast address, and the participating site continues to provide the unicast call information to the appropriate communication units or dispatch consoles at the participating site. If the unicast and multicast call information can be aligned, the participating site switches to providing the appropriate communication units or dispatch consoles at the participating site with the multicast call information and sends cease signal to the sourcing site and/or the zone controller 130. Upon receipt of the cease signal, the sourcing site ceases transmission of the call information on the IP unicast address in step 230. The sourcing site continues to transmit the communication on the IP multicast group address until the call is determined to have ended in step 232.

Of course, if a hole or interruption in the call is acceptable, it should be understood that the unicast transmission can be ceased once the participating site has begun receiving call information from the multicast group without checking whether the call information can be aligned. In such an instance, the cease signal may be transmitted upon a long link delay site beginning to receive call information via the multicast group. The sourcing site may also be configured to simply stop the unicast transmission after a preset amount of time has elapsed instead of waiting for a cease signal. The preset amount of time may be configured by a network administrator or determined independently for each participating site based on the length of the link delay time for that site.

Figure 5:
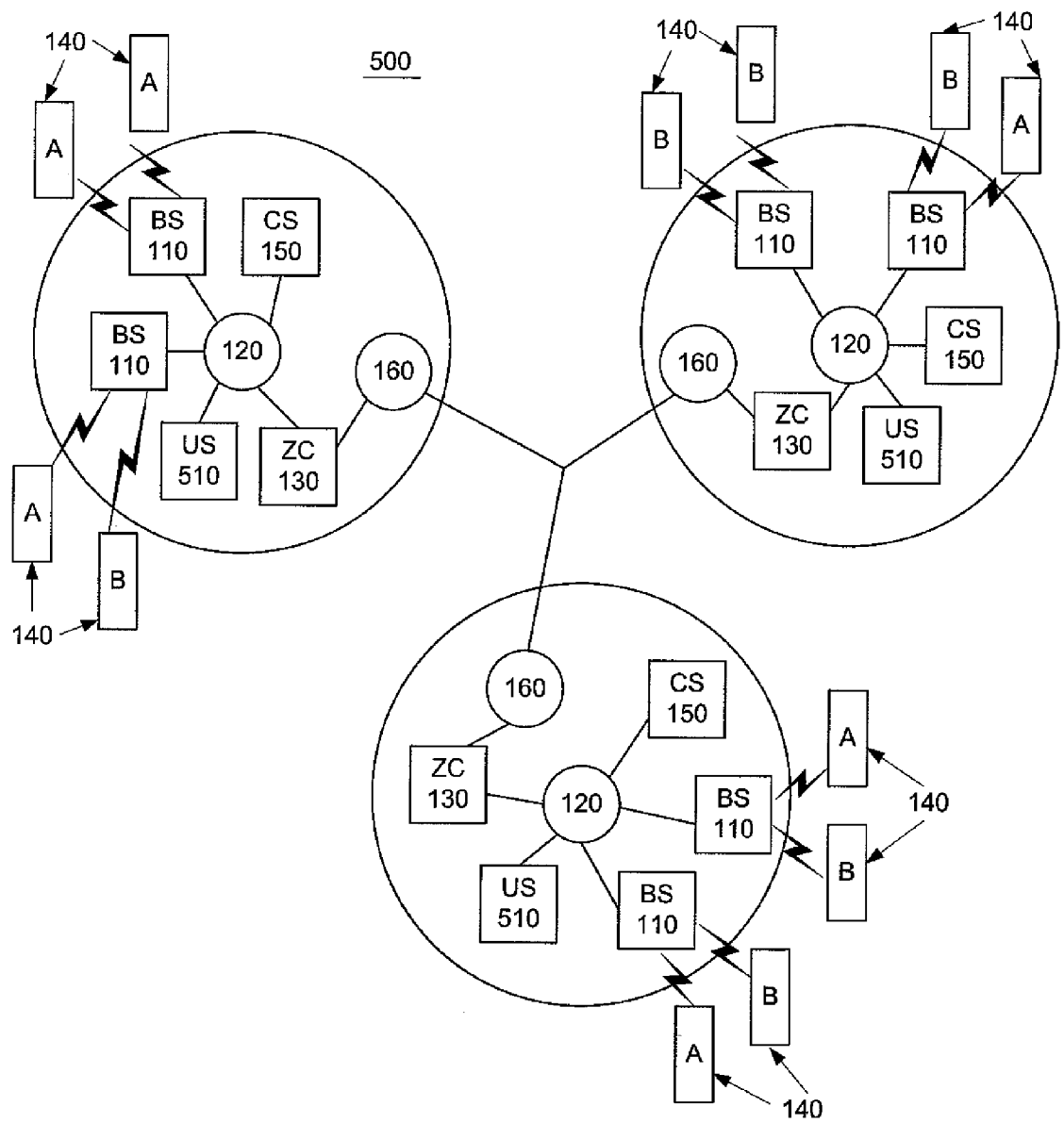
FIG. 5 shows another embodiment of a communication system according to the present disclosure.

FIG. 5 illustrates another embodiment of a communication system 500 in accordance with the present disclosure. In this embodiment, each zone 102 includes a separate unicast server 510. As shown, the unicast server is coupled to the core router. However, it should be understood that the unicast server 510 may also be coupled directly with the zone controller, the exit router, or any other device. The unicast server 510 may also be integrated with the core router, zone controller, the exit router, or any other device.

In this embodiment, rather than having the sourcing site duplicate and transmit unicast call information to each long link delay site, the unicast server 510 may be configured to obtain and transmit via unicast the call information to a long link delay site. In particular, once it is determined that there are long link delay sites for particular call, the zone controller 130 may inform the unicast server 510 of the IP multicast group address that has been assigned to the call as well as the IP unicast address for each long link delay site. The unicast server 510 may then join the multicast group, and retransmit the call information received from the IP multicast group address on the assigned IP unicast address(es).

Using the unicast server 510 in this manner can eliminate any potential bandwidth limitations that may be present at the sourcing site. As with the embodiment described in FIG. 2, the unicast server 510 may also be configured to transmit unicast call information to each long link delay site until a cease signal has been received from the long link delay site or until a preset amount of time has elapsed. The preset amount of time for each long link delay site may be different and may either be preconfigured by a network administrator or determined by the link delay time for the particular site.

By means of the aforementioned disclosure, a communication system is provided in which calls between members of a talkgroup can be established without any loss or truncation of call information when sites with long link delays are present.

Further advantages and modifications of the above described system and method will readily occur to those skilled in the art. The disclosure, in its broader aspects, is therefore not limited to the specific details, representative system and methods, and illustrative examples shown and described above. Various modifications and variations can be made to the above specification without departing from the scope or spirit of the present disclosure, and it is intended that the present disclosure cover all such modifications and variations provided they come within the scope of the following claims and their equivalents.

What is claimed is:

1. A method for transmitting call information in a communication system between members of a talkgroup comprising:
    receiving a call request from a calling unit at a sourcing site;
    determining one or more participating sites for the call;
    determining that at least one of the participating sites is a long link delay site by at least:
        transmitting a first signal from a zone controller to the at least one of the participating sites,
        processing the first signal at the at least one of the participating sites,
        upon finishing processing of the first signal, transmitting a second signal from the at least one of the participating sites to the zone controller, the second signal including at least one of a time stamp indicating a transmission time when the second signal is transmitted from the at least one of the participating sites to the zone controller or an indication of a processing time for the at least one of the participating sites to process the first signal,
        determining at least one of a transmission delay time between transmitting the first signal from the zone controller and receiving the second signal at the zone controller or a reception time at which the second signal is received by the first zone controller, and
        determining whether at least one of the difference between the transmission and reception times or the difference between the processing and transmission delay times is greater than a preset link delay threshold;
    assigning a multicast group having a multicast group address for the call;
    identifying a unicast address for each long link delay site;
    transmitting a call grant signal to the sourcing site and each participating site, the call grant identifying the multicast group address and each unicast address identified for each long link delay site;
    transmitting the call information on the multicast group address; and
    transmitting a copy of the call information on each unicast address identified for each long link delay site.

2. The method of claim 1 wherein determining that at least one of the participating sites is a long link delay site includes manually identifying a participating site as a long link delay site.

3. The method of claim 1 wherein the call information is transmitted on each unicast address identified for each long link delay site by the sourcing site.

4. The method of claim 1 wherein the call information is transmitted on the multicast group address by the sourcing site, and the call information is transmitted on each unicast address identified for each long link delay by a unicast server configured to receive the call information on the multicast address, and retransmit the call information on each unicast address identified for each long link delay site.

5. The method of claim 1 further including:
    determining that a long link delay site has joined the multicast group; and
    ceasing transmission of the call information to a long link delay site on its identified unicast address upon determining that the long link delay site has received call information via the multicast group.

6. The method of claim 5 wherein determining that the long link delay site has received call information via the multicast group includes receiving a cease signal from the long link delay site indicating that the long link delay site is receiving the call information on the multicast group address.

7. The method of claim 5 wherein determining that the long link delay site has received call information via the multicast group includes determining that a predetermined amount of time has elapsed.

8. The method of claim 1 further including:
    determining that a long link delay site has received call information via the multicast group;
    determining whether the call information received by the long link delay site via the multicast group can be aligned with call information received on its identified unicast address; and
    ceasing transmission of the call information to the long link delay site on its identified unicast address upon determining that the long link delay site has received call information via the multicast group and that the call information received by the long link delay site on the multicast group address can be aligned with call information received on its identified unicast address.

9. The method of claim 1 further including distributing, from a long link delay site to one or more receiving units, call information received on its identified unicast address, wherein the one or more receiving units comprise at least one of a communication unit or a dispatch console.

10. The method of claim 9 further including:
    determining that the long link delay site has received call information via the multicast group; and upon determining that the long link delay site has received call information via the multicast group, ceasing distribution of the call information received on its identified unicast address and distributing, from the long link delay site to one or more receiving units, call information received via the multicast group.

11. The method of claim 9 further including
determining that the long link delay site has received call information via the multicast group;
determining whether the call information received by the long link delay site via the multicast group can be aligned with call information received on its identified unicast address; and
upon determining that the long link delay site has received call information via the multicast group and that the call information received via the multicast group can be aligned with call information received on its identified unicast address, ceasing distribution of the call information received on its identified unicast address and distributing, from the long link delay site to one or more receiving units, call information received via the multicast group.

12. A communication system comprising:
a zone controller; and
a plurality of sites coupled to the zone controller, each of the sites being configured to communicate with at least one of a communication unit or a dispatch console;
wherein a sourcing site is configured to transmit a call request to the zone controller upon a call being initiated at a communication unit or dispatch console in communication with the sourcing site, the sourcing site being one of the plurality of sites;
wherein, upon receiving the call request from the sourcing site, the zone controller is configured to determine one or more participating sites for the call, determine whether at least one of the participating sites is a long link delay site, assign a multicast group having a multicast group address for the call, identify a unicast address for each participating site determined to be a long link delay site, and transmit at least one call grant signal identifying the multicast address and each identified unicast address to the sourcing site and each participating site,
wherein the zone controller is configured to determine whether at least one of the participating sites is a long link delay site by at least determining whether at least one of the difference between transmission and reception times or the difference between processing and transmission delay times is greater than a preset link delay threshold, the reception time being the time a first signal from the at least one of the participating sites is received by the zone controller, the first signal being in response to a second signal from the zone controller, the transmission time being the time indicated by a timestamp in the first signal as being transmitted by the at least one of the participating sites, the processing time being indicated in the first signal as the time for the at least one of the participating sites to process the first signal, and the transmission delay time being the time between the zone controller transmitting the second signal and receiving the first signal, and
wherein one copy of the call information is transmitted on the multicast group address, and another copy of the call information is transmitted to each long link delay site on the respective unicast address.

13. The system of claim 12 wherein the copy of the call information transmitted to each long link delay site on the respective unicast address is transmitted by the sourcing site.

14. The system of claim 12 further including a unicast server coupled to the plurality of sites and the zone controller, the unicast server being configured to receive the copy of the call information being transmitted on the multicast group address, and transmit copies of the call information to each long link delay site on the respective unicast address identified by the zone controller.

15. The system of claim 12 wherein at least one of the sourcing site or the zone controller is further configured to determine a long link delay site has received call information via the multicast group, and cease transmission of the call information to the long link delay site on the respective unicast address once it is determined that the long link delay site has received call information via the multicast group.

16. The method of claim 12 wherein at least one of the sourcing site or the zone controller is further configured to determine that a long link delay site has received call information via the multicast group, determine whether the call information received by the long link delay site on the multicast group address can be aligned with the call information received on the respective unicast address; and cease transmission of the call information to the long link delay site on the respective unicast address upon determining that the long link delay site has received call information via the multicast group and that the call information received by the long link delay site on the multicast group address can be aligned with call information received on the respective unicast address.

17. The system of claim 12 wherein transmission of each copy of the call information on the respective unicast address is ceased after a predetermined amount of time.

18. The system of claim 17 wherein the predetermined amount of time is determined independently for each long link delay site based on the link delay time for each long link delay site.

* * * * *